(12) United States Patent
Roussy

(10) Patent No.: US 8,132,631 B2
(45) Date of Patent: *Mar. 13, 2012

(54) METHOD OF GEOTHERMAL LOOP INSTALLATION

(76) Inventor: Raymond J. Roussy, Surrey (CA)

( * ) Notice: Subject to any disclaimer, the term of this patent is extended or adjusted under 35 U.S.C. 154(b) by 1168 days.

This patent is subject to a terminal disclaimer.

(21) Appl. No.: 11/980,790

(22) Filed: Oct. 31, 2007

(65) Prior Publication Data

US 2008/0083565 A1    Apr. 10, 2008

Related U.S. Application Data

(63) Continuation-in-part of application No. 11/067,225, filed on Feb. 28, 2005, now abandoned.

(51) Int. Cl.
  *E21B 7/24* (2006.01)
  *E21B 33/13* (2006.01)
  *F24J 3/08* (2006.01)

(52) U.S. Cl. ............ 175/56; 175/57; 175/171; 175/293; 175/296; 165/45

(58) Field of Classification Search .................... 175/56, 175/57, 171, 293, 296; 165/45
  See application file for complete search history.

(56) References Cited

U.S. PATENT DOCUMENTS

| | | |
|---|---|---|
| 1,681,883 A | 8/1928 | Sipe |
| 2,123,364 A | 7/1938 | Katterjohn |
| 2,776,113 A | 1/1957 | Reh |
| 2,893,692 A | 7/1959 | Marx |
| 2,942,849 A | 6/1960 | Bodine |
| 3,023,820 A | 3/1962 | Desvaux et al. |
| 3,467,207 A | 9/1969 | Pyles et al. |
| 3,604,214 A | 9/1971 | Turzillo |
| 3,786,874 A | 1/1974 | Jodet et al. |
| 3,815,368 A | 6/1974 | Turzillo |
| 3,866,693 A | 2/1975 | Century |
| 3,886,754 A | 6/1975 | Turzillo |

(Continued)

FOREIGN PATENT DOCUMENTS

CN    2047717 U    11/1989

(Continued)

OTHER PUBLICATIONS

U.S. Appl. No. 12/327,973, Raymond Roussy.

(Continued)

*Primary Examiner* — Giovanna Wright
(74) *Attorney, Agent, or Firm* — Berenato & White, LLC

(57) ABSTRACT

There is provided a method for drilling a hole into the ground and installing a geothermal transfer loop. A drilling apparatus is positioned at a desired location. The drilling apparatus includes a rotating and vibrating apparatus, such as a sonic drill, for rotating and vibrating a hollow drill string into the ground. The hollow drill string having an inner space. A hole is drilled to a desired depth by rotating and vibrating the hollow drill string into the ground while discharging fluid into the inner space of the hollow drill string. The fluid forming a fluid column in the inner space of the drill string. The fluid column impedes entry of ground materials into the inner space of the drill string and is vibrated to create a water hammer for adding an additional drilling force. A geothermal transfer loop is lowered into the inner space of the hollow drill string and the drill string is removed from the ground. The method may also include discharging grouting material into the hole.

5 Claims, 5 Drawing Sheets

U.S. PATENT DOCUMENTS

| | | | |
|---|---|---|---|
| 3,962,879 | A | 6/1976 | Turzillo |
| 4,286,651 | A | 9/1981 | Steiger et al. |
| 4,645,017 | A | 2/1987 | Bodine et al. |
| 4,705,118 | A | 11/1987 | Ennis |
| 5,009,272 | A | 4/1991 | Walter |
| 5,027,908 | A | 7/1991 | Roussy |
| 5,409,070 | A | 4/1995 | Roussy |
| 5,417,290 | A | 5/1995 | Barrow |
| 5,533,356 | A | 7/1996 | DeMasters |
| 5,590,715 | A | 1/1997 | Amerman |
| 5,634,515 | A | 6/1997 | Lambert |
| 5,642,964 | A | 7/1997 | DeMasters |
| 6,000,459 | A | 12/1999 | Jeppesen |
| 6,112,833 | A | 9/2000 | Lambert |
| 6,672,371 | B1 | 1/2004 | Amerman |
| 6,910,542 | B1 * | 6/2005 | Walter ............... 175/56 |
| 6,955,219 | B2 | 10/2005 | Johnson, Jr. |
| 7,093,657 | B2 | 8/2006 | Johnson, Jr. |
| 7,270,182 | B2 | 9/2007 | Johnson, Jr. |
| 7,647,988 | B2 * | 1/2010 | Roussy ............... 175/56 |
| 2003/0221870 | A1 | 12/2003 | Johnson |
| 2006/0191719 | A1 | 8/2006 | Roussy |
| 2008/0083565 | A1 | 4/2008 | Roussy |
| 2009/0065255 | A1 | 3/2009 | Roussy |

FOREIGN PATENT DOCUMENTS

| | | |
|---|---|---|
| GB | 2436582 | 10/2007 |
| WO | WO 93/16236 | 8/1993 |
| WO | WO 99/63282 A1 | 12/1999 |
| WO | WO 2005/003648 | 1/2005 |
| WO | WO 2006089400 A1 | 8/2006 |

OTHER PUBLICATIONS

U.S. Appl. No. 12/035,776, Raymond Roussy.

"Ground Storage of Energy in Buildings" Arup.com. <http://arup.com/geotechnic/feature.cfm?pageid=662>.

"Energy Piles". Skanska.co.uk. <http://www.skansa.co.uk/skansa/templates/page.asp?id=9755>.

"Skanska Technical Data Sheet". Skanska.co.uk. May 4, 2006. <http://www.skansa.co.uk/index.asp?id=2849>.

Koene, Frans and Geelen Charles. "Energy piles as an efficient way to store heat". CADDET Energy Efficiency. 2000. <http://www.caddet.org/public/uploads/pdfs/newsletter/00s_01.pdf.

Sanner, Burkhard. "Shallow Geothermal Energy." Geo-Heat Center Bulletin. Jun. 2001. <http://geoheat.oit.edu/bulletin/bull22-2/art4.pdf>.

Armour, Tom A., P.E. "Micropiles for Earth Retention and Slope Stabilization." ADSC: The Interational Association of Foundation of Drilling.

Fitzgerald, Curt and Lewis, Dwayne. Installation of Drilled Cased Micropiles using Low Mobility Grout. Presented at the Great Lakes Geotechnical/Geoenvironmental Engineering Conference on May 7, 2004.

* cited by examiner

METHOD OF GEOTHERMAL LOOP INSTALLATION

CROSS-REFERENCE TO RELATED APPLICATION AND CLAIM TO PRIORITY

This application is a continuation-in-part of application Ser. No. 11/067,225, filed Feb. 28, 2005 now abandoned, the disclosure of which is incorporated herein by reference and to which priority is claimed.

BACKGROUND OF THE INVENTION

This invention relates to geothermal heat exchange systems and, in particular, to the installation of geothermal transfer loops with sonic drills.

Geothermal heat exchange systems are environmentally friendly, energy efficient heating and cooling systems. As such, there is a rising demand for geothermal heat exchange systems for both commercial and residential properties. There is therefore a need for a quick and efficient method of installing the geothermal transfer loops used in many geothermal heat exchange systems.

SUMMARY OF THE INVENTION

According to one aspect of the invention, there is provided a method for drilling a hole and installing a geothermal transfer loop. A drilling apparatus is positioned at a desired location. The drilling apparatus includes a rotating and vibrating apparatus for rotating and vibrating a hollow drill string into the ground. The hollow drill string having an inner space. A hole is drilled to a desired depth by rotating and vibrating the hollow drill string into the ground while discharging fluid into the inner space of the hollow drill string. The fluid forming a fluid column in the inner space of the drill string. The fluid column impedes entry of ground materials into the inner space of the drill string and is vibrated to create a water hammer for adding an additional drilling force. A geothermal transfer loop is lowered into the inner space of the hollow drill string and the drill string is removed from the ground. The method may also include discharging grouting material into the hole.

According to another aspect of the invention, there is provided a method of drilling a hole and installing a geothermal transfer loop. A drilling apparatus is positioned at a desired location. The drilling apparatus includes a rotating and vibrating apparatus for rotating and vibrating a hollow drill string into the ground. The hollow drill string having an inner space. A hole is drilled to a desired depth by rotating and vibrating the hollow drill string into the ground while discharging a fluid into the inner space of the hollow drill string. The fluid forming a fluid column in the inner space of the drill string. The fluid column impedes entry of ground materials into the inner space of the drill string and is vibrated to create a water hammer for adding an additional drilling force. A geothermal transfer loop is lowered into the inner space of the hollow drill string. The geothermal transfer loop is filled with a second fluid and a portion of the geothermal transfer loop is straight. The straightened portion of the geothermal transfer loop is lowered first. Weights are attached to the geothermal transfer loop. The hollow drill string is vibrated out of the ground while grouting material is simultaneously discharged into the inner space of the hollow drill string. The geothermal transfer loop is operatively connected to a heat exchanger.

The method allows for cased holes to be drilled quickly and in lithologies that are often difficult for conventional drill rigs to drill in. The method also allows for more accurate control and monitoring of the grouting process.

The method provides the advantage of facilitating the lowering of geothermal transfer loops supplied in coils by eliminating the problem of the coils catching on mud on the side of the hole because the hole is cased.

DESCRIPTION OF THE PREFERRED EMBODIMENTS

Figure 1:
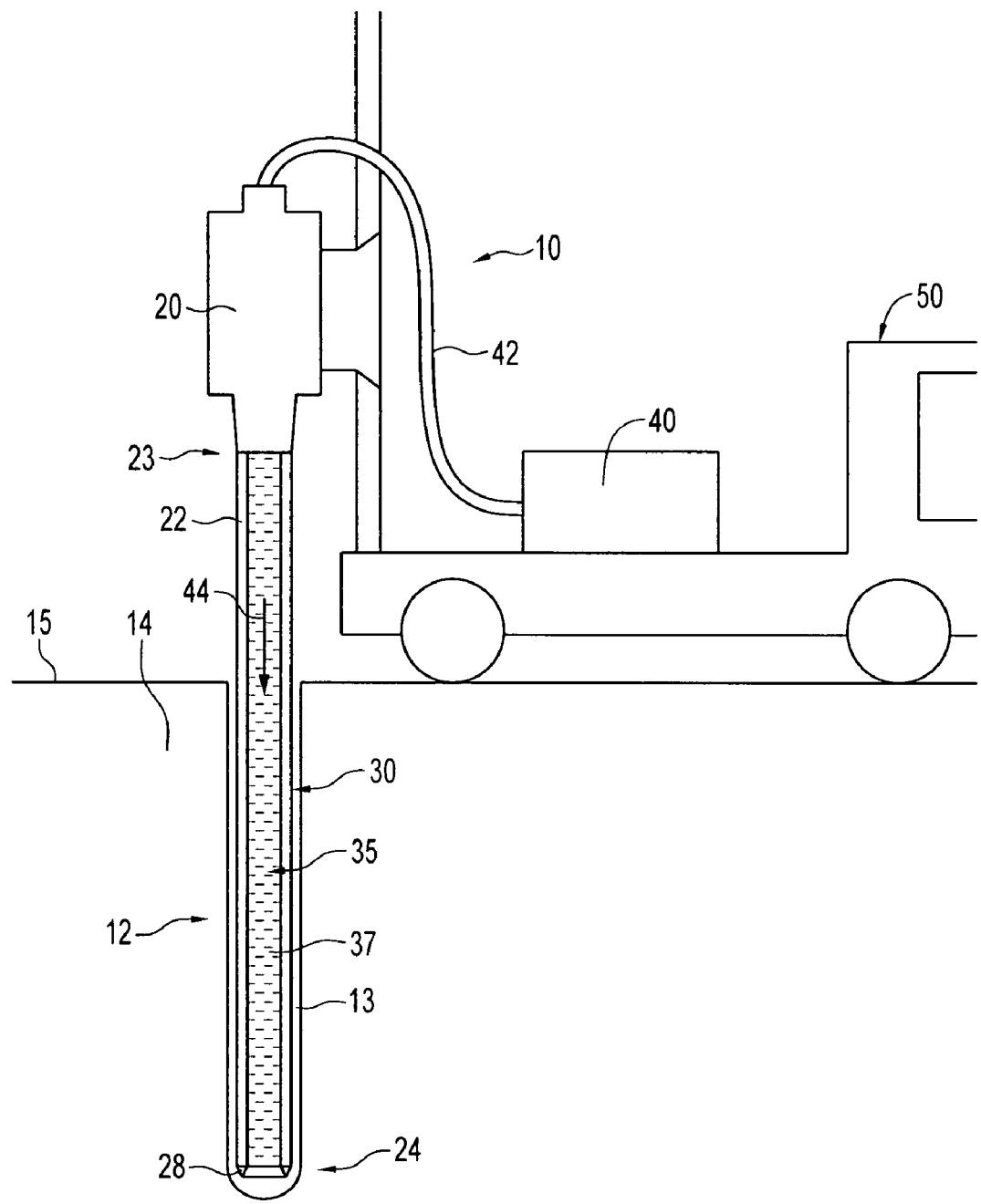
FIG. 1 is an elevational, partly in section, view of a drilling rig drilling a hole, using a method according to the invention.

Referring to the drawings, and first to FIG. 1, this shows a method of drilling a hole 12 into the ground 14 according to a preferred method of the invention. A drilling apparatus 20 is mounted on a movable vehicle 50. The vehicle 50 is moved to a desired drilling location and the drilling apparatus 20 is placed in a desired drilling position. A drill pipe 22 is threadedly connected to the drilling apparatus 20 at a first end 23, and the drill pipe 22 is threadedly connected to a drill bit 28 at a second end 24. The drill pipe 22 is hollow and is open at both ends 23 and 24. In this example, the drill bit 28 is a ring bit that is concentric with drill pipe 22. This combination of drill pipe 22 and drill bit 28 forms an open ended drill string 30. There is a cavity or inner space 35 encompassed by the drill string 30.

The drilling apparatus 20 is a rotary and vibratory apparatus such as a sonic drill. Sonic drills are known in the art and accordingly are not described in more detail herein. Examples of sonic drills are described in my earlier U.S. Pat. No. 5,027,908 and U.S. Pat. No. 5,409,070 which are hereby incorporated by reference. The drilling apparatus rotates and vibrates the drill string 30 into the ground 14. A hose 42 hydraulically connects a pressurized fluid pump apparatus 40 to the drilling apparatus. A pressurized fluid is pumped by the pressurized fluid apparatus or pump 40 along the hose 42, through the drilling apparatus 20, and into the inner space 35 of the drill string 30 as indicated by arrow 44 during the drilling process. In this example of the method, the pressurized fluid is water but water with added components such as polymer or clay may also be used. The fluid has a pressure range of between 100-5000 psi, with the preferred pressure range being between 500-2000 psi. This pressure facilitates faster drilling in ground conditions that would otherwise block the flow of pressurized fluid out of the drill bit 28.

A column of fluid 37 fills the inner space 35 acting as a plug in the drill string 30, impeding the entry of ground materials into the inner space 35. The diameter of the hose 42 is less than the diameter of the inner space 35, thereby preventing the pressurized fluid from being pushed back through the hose in response to high pressure spikes created when the pressurized fluid impacts the ground 14 in the hole 12. The vibrating drill string 30 causes the pressure in the fluid column to oscillate at the same frequency that the drill string is vibrated at. The pressure spikes thus created causes the fluid column to act in a manner similar to a water hammer, thereby adding an additional drilling force.

Figure 2:
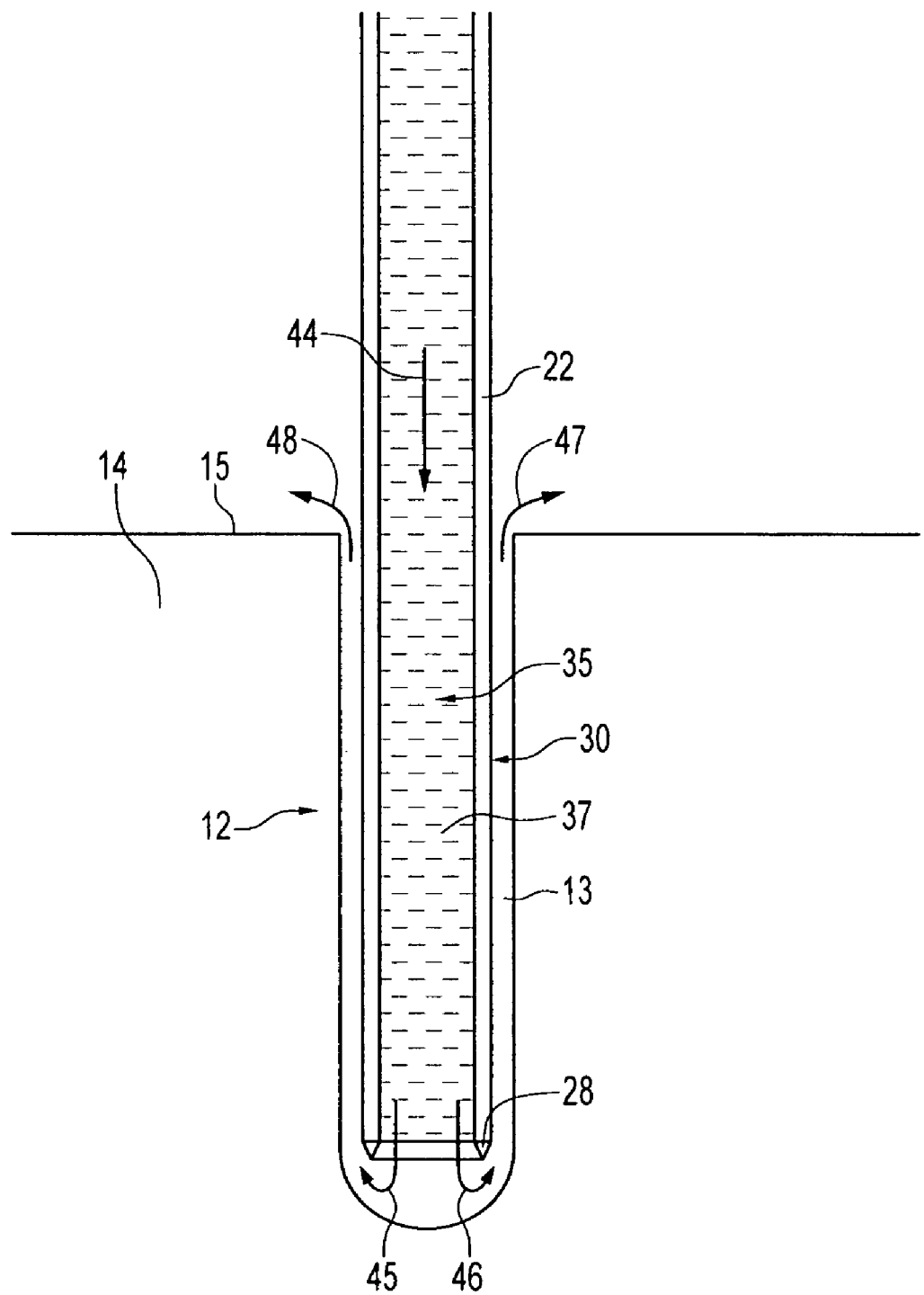
FIG. 2 is an elevational, cross-sectional, diagram illustrating pressurized fluid carrying drill cuttings to the ground surface, using a method according to the invention.

At minimum, sufficient pressurized fluid is pumped into the inner space 35 to form a fluid column 37 that impedes the entry of ground materials into the inner space 35. However, additional pressurized fluid may be pumped into the inner space 35 in order to carry cuttings up the annulus 13, between the drill string and the hole, to the ground surface 15, as illustrated in FIG. 2. Arrow 44 indicates the direction of the flow of pressurized fluid into the ground 14 through the inner space 35 of the drill string 30. The excess pressurized fluid is pushed down and around the drill bit 28 and up the annulus 13 towards the surface as indicated by arrows 45 and 46. The pressurized fluid carries cuttings as it moves up the annulus 13 to the ground surface 15 where the pressurized fluid and cuttings are expelled from the hole 12 as indicated by arrows 47 and 48.

Figure 3:
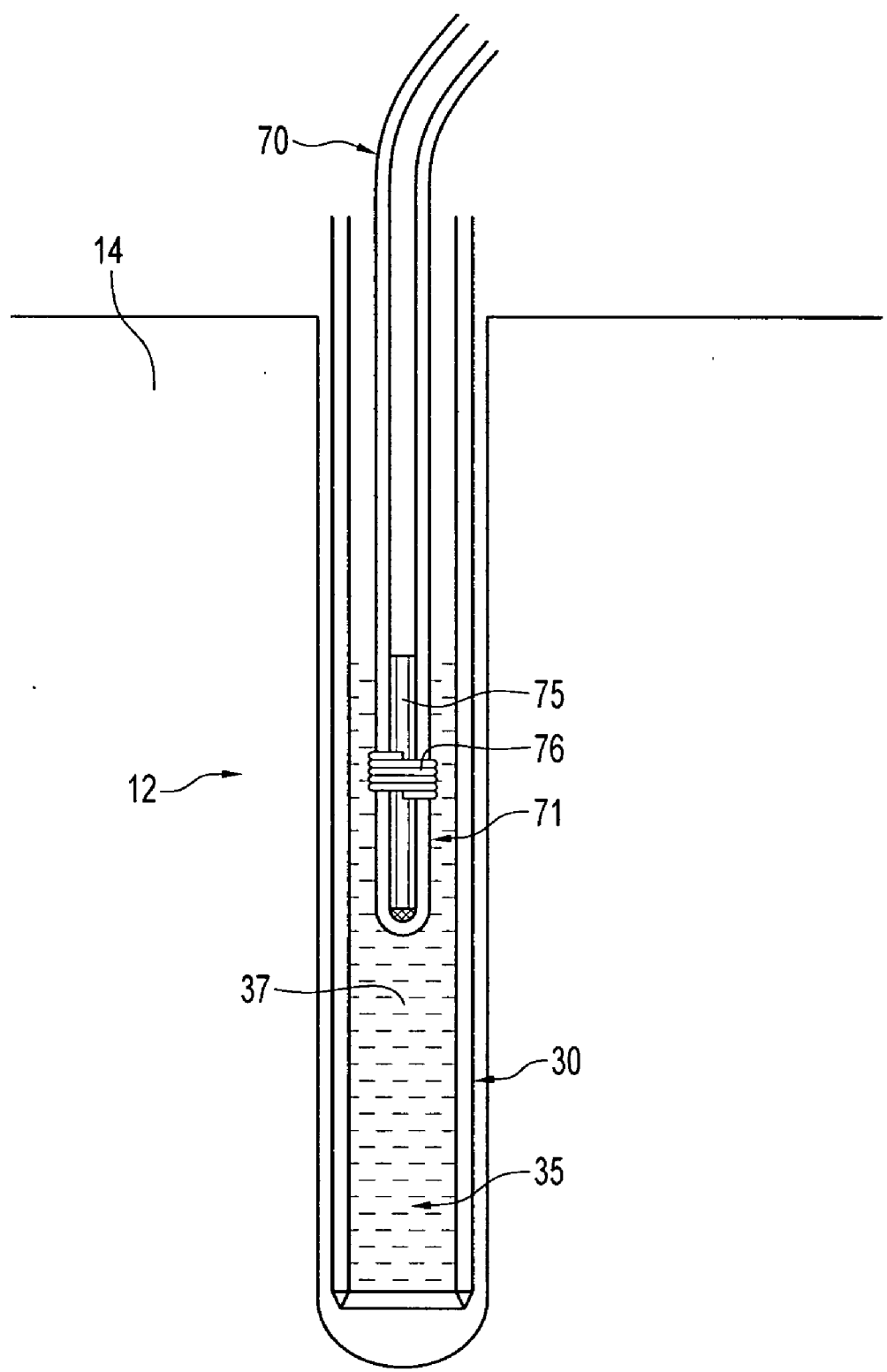
FIG. 3 is an elevational, cross-sectional, diagram illustrating the lowering of a geothermal transfer loop into the hole, using a method according to the invention.

As the depth of the hole increases, additional drill pipes (not shown) may be added to the drill string 30 in sequence. Each additional drill pipe has a first end and a second end. The additional drill pipes are hollow and open at both ends. The first ends of the additional drill pipes are threadedly connected to the drilling apparatus 20 and the second ends of the additional drill pipes are threadedly connected to the drill string 30. The additional drill pipes may then be rotated and vibrated into the ground, thereby increasing the length of the drill string 30 and the depth of the hole 12. The additional drill pipes may be added manually or with an automated drill pipe handling apparatus. Once the hole 12 has been drilled to a desired depth the drill string 30 is disconnected from the drilling apparatus 20, leaving a hole 12 which is cased by the drill string 30, as illustrated in FIG. 3. A geothermal transfer loop 70 is lowered into the hole 12 through the inner space 35 of the drill string 30, as indicated by arrow 44. It is to be noted however, that in other examples of the method the drill string 30 may be removed prior to the lowering of the geothermal transfer loop 70 into the hole 12.

The geothermal transfer loop is preferably filled with a fluid prior to being lowered into the hole 12. In this example of the method, the geothermal transfer loop 70 is a high density polyethylene tube and is filled with water. The fluid adds weight to the geothermal transfer loop 70 and prevents the geothermal transfer loop 70 from collapsing in any fluid column that may remain in the inner space 35 of the drill string 30. Weights 75 may also be attached to the geothermal transfer loop 70 to facilitate the lowering of the geothermal transfer loop 70 into the hole 12. The lead portion 71 of the geothermal transfer loop 70 may be straightened to aid in keeping the geothermal transfer loop 70 at the bottom of the hole 12 during grouting and withdrawal of the drill string 30. In this example of the method, the weight 75 is an elongated piece of steel bar that has been attached to the lead portion 71 of the geothermal transfer loop 70 by wiring 76 around the steel bar and the geothermal transfer loop. The steel bar performs the dual function of a weight and a means for straightening the lead portion 71 of the geothermal transfer loop 70. Once the geothermal loop 70 has been completely lowered the drill string is removed from the hole 12 and the hole is grouted. The hole 12 may be grouted with the drill string 30 remaining in the ground 14 or after the drill string 30 has been removed from the ground.

Figure 4:
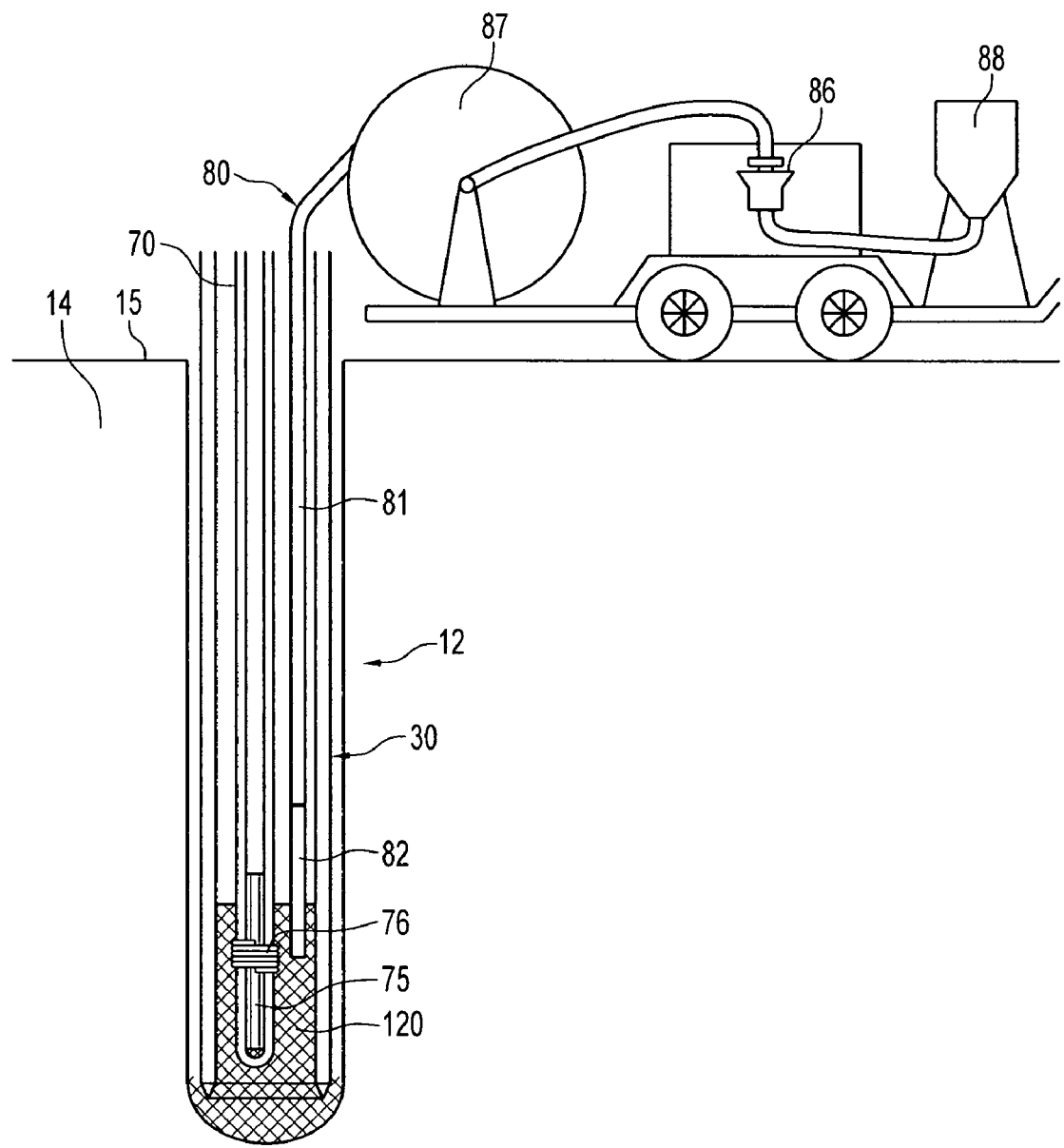
FIG. 4 is an elevational, partly in section, view of a grouting rig grouting the hole, using a method according to the invention.

In this example of the method, grouting is accomplished by the tremie line method as illustrated in FIG. 4. A tremie line hose 80 is lowered into the hole 12. The tremie line hose is comprised of a steel pipe section 82 at a first end and a flexible tube section 81 at a second end, the steel pipe section 82 being the lead end of the tremie line 80 lowered into the hole 12. A pump 86 pumps thermally conductive grouting material 120 from a reservoir 88 along the tremie hose line 80 to the bottom of the hole 12. The grouting material 120 encompasses the geothermal transfer loop 70. As the hole 12 is filled from the bottom up, a tremie line hose reel 87 pulls the tremie line hose 80 out of the hole 12, so as to maintain the lead end of the tremie line hose 80 below the grouting material 120. This process is continued until the hole 12 has been filled with grouting material 120 and the grouting material encompasses the portion of the geothermal transfer loop 70 which is below the ground surface 15.

In other examples of the method, grouting may be accomplished by the pressure grouting method. Pressure grouting may be accomplished by attaching a grout line to the top of the of the drill string 30 or a grout line can be attached to the swivel on the drill head. As the drill string 30 is removed from the ground, grouting material is simultanoeusly pumped into the inner space 35 of the drill string 30. The grouting is topped up once the casing has been removed. In some cases grouting may not be required, for example in silty or sandy soils which collapse about the geothermal loop when the drill string is removed.

Figure 5:
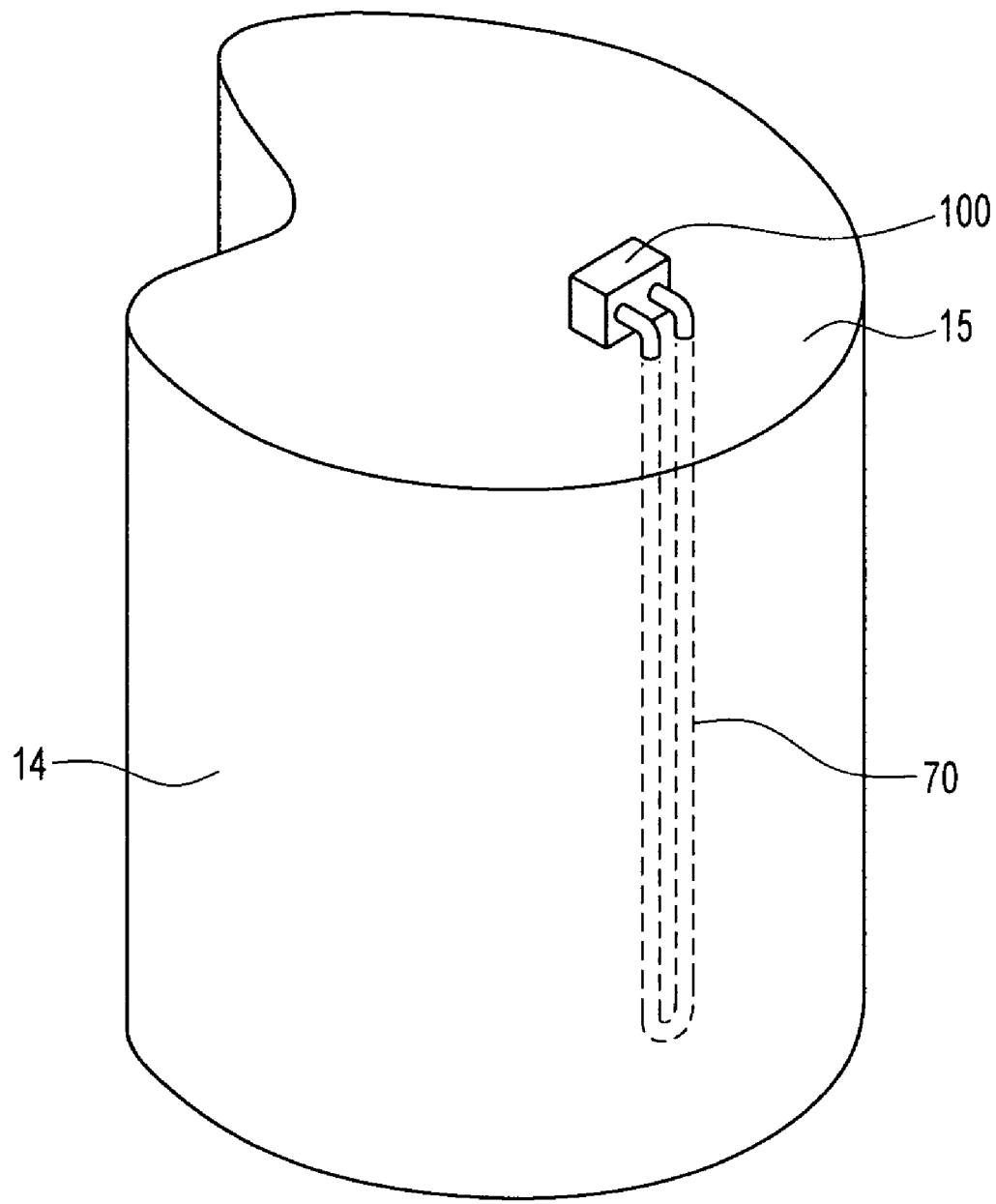
FIG. 5 is an perspective view of a geothermal exchange loop connected to a heat exchanger, using a method according to the invention.

Once the grouting process is completed, either by the tremie line method or the pressure grouting method, the geothermal transfer loop 70 may be operatively connected to a heat exchanger 100, as illustrated in FIG. 5. The geothermal transfer loop 70 may also be operatively connected below the ground surface, in series, to additional geothermal transfer loops below the surface. The series geothermal transfer loops are then connected to a communal heat exchanger.

It will be understood by someone skilled in the art that many of the details provided above are by way of example only and can be varied or deleted without departing from the scope of the invention as set out in the following claims.

I claim:

1. A method of drilling a hole into the ground and installing a geothermal transfer loop, the method comprising:
    positioning a drilling apparatus at a desired location, the drilling apparatus including a rotating and vibrating apparatus for rotating and vibrating a hollow drill string into the ground, the hollow drill string having an inner space;
    drilling the hole to a desired depth by rotating and vibrating the hollow drill string into the ground while discharging a fluid into the inner space of the hollow drill string, the fluid forming a fluid column in the inner space of the drill string for impeding entry of ground materials into the inner space of the drill string;
    vibrating the fluid column to create a water hammer for adding an additional drilling force;
    lowering the geothermal transfer loop into the inner space of the hollow drill string following the drilling of the hole to the desired depth; and
    removing the hollow drill string from the ground.

2. The method claimed in claim 1, further including discharging grouting material into the inner space of the hollow drill string following the lowering of the geothermal transfer loop into the inner space of the hollow drill string.

3. The method claimed in claim 2, further including rotating and vibrating the hollow drill string out of the ground following the lowering of the geothermal transfer loop into the inner space of the hollow drill string.

4. The method claimed in claim 1, further including vibrating the hollow drill string out of the ground while simultaneously discharging grouting material into the inner space of the hollow drill string following the lowering of the geothermal transfer loop into the inner space of the hollow drill string.

5. The method as claimed in claim 1, further including operatively connecting the geothermal loop to a heat exchanger.

* * * * *